United States Patent [19]

Schmidt

[11] 3,999,275
[45] Dec. 28, 1976

[54] TOOL FOR DRIVING BALANCE WEIGHTS ONTO SPOKED WHEELS

[75] Inventor: Günter Schmidt, Darmstadt, Germany

[73] Assignee: Gebr, Hofmann KG, Darmstadt, Germany

[22] Filed: Feb. 27, 1976

[21] Appl. No.: 662,255

[30] Foreign Application Priority Data

Mar. 1, 1975 Germany ............... 7506419[U]

[52] U.S. Cl. ............................................. 29/275
[51] Int. Cl.² ...................................... B25B 27/02
[58] Field of Search ................. 29/275, 254, 255; 81/52.3; 254/131

[56] References Cited

UNITED STATES PATENTS

| | | | |
|---|---|---|---|
| 2,292,898 | 8/1942 | Peirce | 29/275 X |
| 2,860,408 | 11/1958 | Woyton | 29/275 |
| 3,152,391 | 10/1964 | Bjorn | 29/254 |
| 3,585,704 | 6/1971 | Schroeder | 29/275 |
| 3,775,827 | 12/1973 | Keserin | 29/275 |

*Primary Examiner*—Al Lawrence Smith
*Assistant Examiner*—J. C. Peters
*Attorney, Agent, or Firm*—Cushman, Darby & Cushman

[57] ABSTRACT

A tool for driving balance weights of the type having the shape of a slotted bushing which is attached to a spoke nipple by a press fit, the tool having a handle at one end and a weight receiving opening at the other. A lateral slot communicates with the opening for receiving a spoke and a crowned anvil is provided between the ends for hammering the weight in place against the rim without deforming the weight.

4 Claims, 2 Drawing Figures

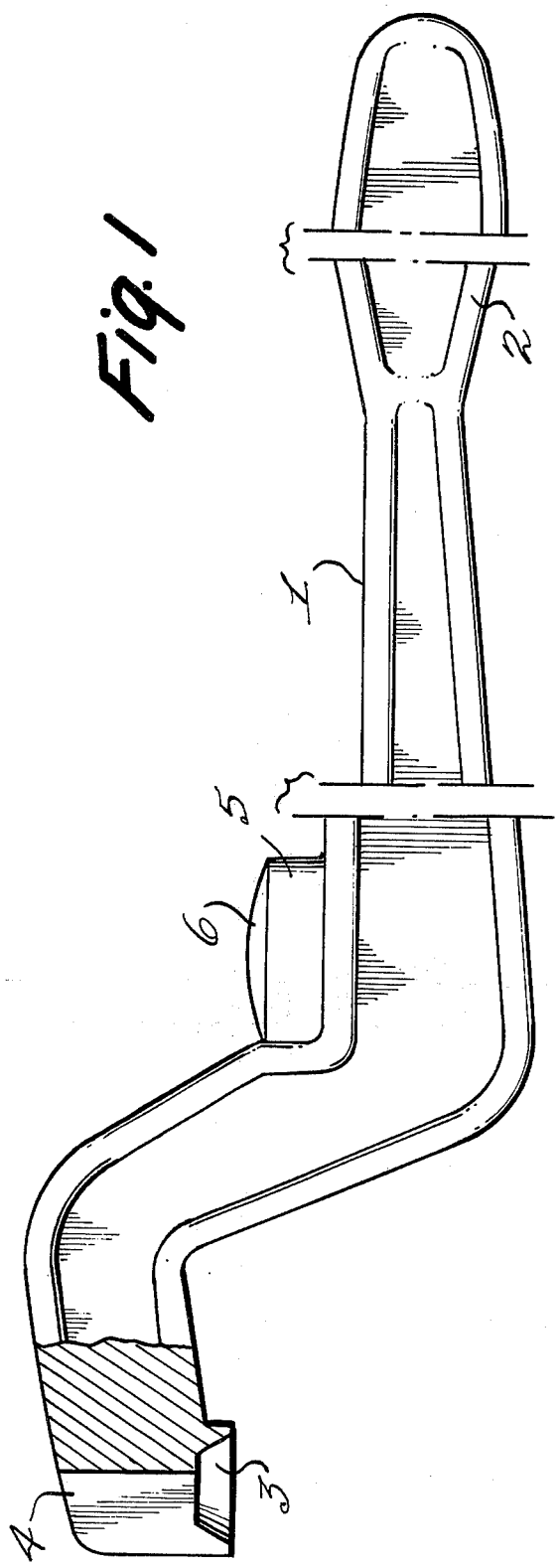
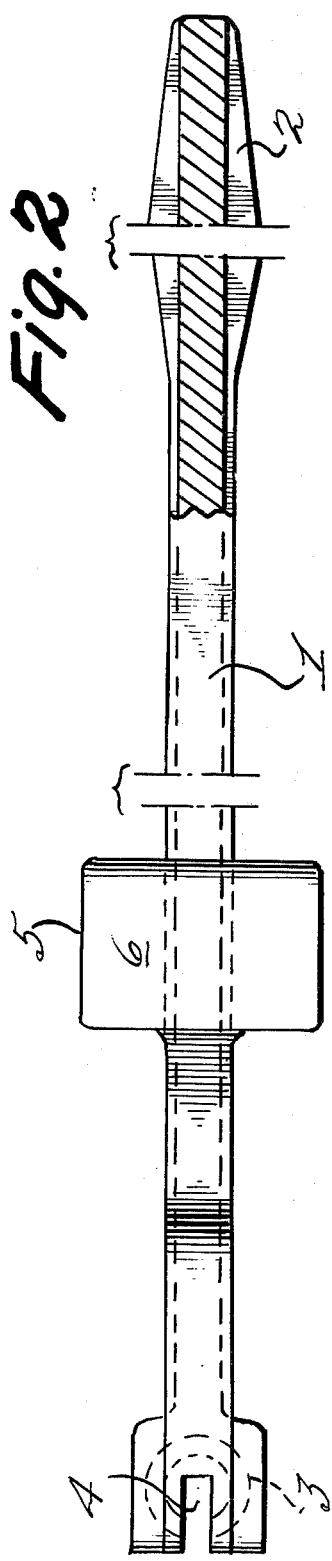

TOOL FOR DRIVING BALANCE WEIGHTS ONTO SPOKED WHEELS

The invention relates to a tool for driving balance weights onto spoked wheels, especially motor-cycle wheels.

It is known that unbalances in wheels, especially motor-cycle wheels, have an extremely negative effect on the running features and the service life of such wheels. Furthermore unbalance forces causing vibrations during traveling can have a serious detrimental effect which may even result in a reduced travel safety.

The known balance weights according to DBP 925 635 are usually threaded manually on the spoke and then knocked directly on the cylindrical part of the spoke nipple by means of a hammer. Due to this unilateral knocking effect the weight can be deformed to such an extent that its adhesive power is no longer sufficient so that the weight comes off during traveling. Furthermore the unilateral knocking effect possibly results in a spalling of the balance weights.

With motor-cycle wheels provided with disc brakes on both sides the balance weights cannot be attached by means of the known tools without damaging the brake discs.

It is the object of the invention to avoid the known disadvantages and to propose a device by means of which it is possible to knock the balance weights on the cylindrical part of the spoke nipple in such a way that they are neither deformed nor do they spall.

This object is achieved according to the invention in that a tool is at one end provided with a reception hole for the balance weight and with at least one lateral slot. Prior to the knocking-on procedure the spoke is pushed through the slot. At the other end the tool is preferably provided with a handle. In the middle part an anvil is provided, the upper side of which is preferably crowned.

The invention is now explained in detail with the aid of the attached figures.

FIG. 1 shows a side view of a tool according to the invention.

FIG. 2 shows the top view of a tool according to the invention.

A body 1 is provided with a handle 2 at one end. At the other end an opening 3 preferably shaped like the balance weight is provided. At the front end a slot 4 is provided into which the wheel spoke can be pushed. The middle part of the body 1 can be bent twice for easier handling. The anvil 5 can be crowned at the upper side 6.

For fitting, the balance weight (not shown in the figure) is pushed over the wheel spoke. Then the tool is brought in working position by pushing the wheel spoke through the slot 15 in the front part of the tool and by positioning the opening 3 above the balance weight. Subsequently slight hammer blows are carried out on the anvil 5, 6 until the upper edge of the balance weight lies against the rim edge.

Owing to the firm and form-closed incorporation of the balance weight in the opening 3 the latter is uniformly stressed so that no deformation or outbreaks can take place. Furthermore, with the tool according to the invention damaging of the chromium-plated surface of the balance weight is avoided.

Many changes and modifications in the above described embodiment of the invention can of course be carried out without departing from the scope of the invention. Accordingly, that scope is intended to be limited only by the scope of the appended claims.

What is claimed is:

1. A tool for driving onto spoked wheels balance weights of the type having the shape of a slotted bushing which is attached to a spoke nipple by press fit, said tool having:
    a handle at one end thereof;
    a weight engaging opposing end with an opening for receiving a weight and a lateral slot communicating with said opening for receiving a spoke; and,
    an anvil between said ends so that force applied to said anvil positions a weight in said opening against the rim edge without damaging said weight.

2. A tool as in claim 1 wherein said opening tapers inwardly about an axis transverse to the direction that said slot extends.

3. A tool as in claim 1 wherein the part of said tool between said ends is bent.

4. A tool as in claim 1 wherein said anvil is crowned.

* * * * *